United States Patent Office 3,824,221
Patented July 16, 1974

3,824,221
METALLATED POLYMERS
Pudens Leonard Ragg, Runcorn, England, assignor to Imperial Chemical Industries Limited, London, England
No Drawing. Filed Jan. 2, 1970, Ser. No. 456
Claims priority, application Great Britain, Jan. 9, 1969, 1,320/69; June 24, 1969, 13,889/69
Int. Cl. C07c 45/02; C08f 3/00, 3/02
U.S. Cl. 260—80 PS                                   4 Claims

ABSTRACT OF THE DISCLOSURE

Metallated polymers and copolymers and styrylphosphine containing a plurality of $PR_2$ groups (where R is a hydrocarbyl group) as substituents of the benzene rings, transition metal atoms being co-ordinated to the phosphorus atoms. Several methods of preparation are described. The metallated polymers may be used to catalyse a variety of liquid or gas phase organic reactions, such as hydroformylation, olefin oligomerisation, hydrogenation and disproportionation, the reactions for which they are effective depending on the choice of metal and polymer. Copolymers, especially with styrene, are also included.

---

This invention relates to metallated polymers in which metal atoms are chemically bonded to polymer chains through phosphorus atoms attached to the polymer chains, to methods for preparing such polymers, and to organic reactions catalysed by such polymers.

One aspect of the invention comprises polymers of styrylphosphines having transition metal atoms co-ordinated with the phosphorus atoms, the polymer being one formed by the polymerisation of a substituted styrene containing at least one phosphine group, $PR_2$, as a substituent on the benzene ring, where R is a hydrocarbyl group, such as an alkyl, aryl, alkaryl, aralkyl, or alkenyl group or such a group carrying only simple substituents.

Within the term "polymers" we include homopolymers, copolymers, mixtures and blends thereof. Styrene is a preferred co-monomer.

Other substituents may be present in the benzene ring, provided that these do not interfere with reactions leading to the formation of polymers nor with reactions in which the polymers are subsequently used. The present invention is particularly directed to the metallation of polymers obtainable from monomers of the general formula $p\text{-}CH_2{:}CH.C_6H_4PR_2$ and copolymers of such compounds with styrene. In the above formula, R is preferably an aryl group such as phenyl or a lower alkyl group having not more than 6 carbon atoms, such as methyl or ethyl.

The transition metals which may be incorporated in polymers according to the invention are those metals which are capable of forming co-ordination complexes with trivalent phosphorus-containing compounds. The most important of these are the metals of Groups IVA to VIII and Group IB of the Periodic Table of Elements, especially the metals of Group VIII. Examples of suitable meals include cobalt, nickel, palladium, platinum, titanium, vanadium, chromium and manganese.

Metallated polymers according to our invention may be used as catalysts in a variety of liquid or gas phase organic reactions. For example, metallated polymers containing Group VIII metals, such as cobalt, nickel, palladium and platinum, may be used to catalyse hydroformylation, hydrogenation and oligomerisation reactions. However, it will be appreciated that the effectiveness of our metallated polymers in any specific reaction will depend upon the choice of metal, phosphine and polymer, together with the reaction conditions used. For example, certain of our metallated polymers containing Group IVA to VIA metals may be used to catalyse polymerisation and disproportionation reactions.

A second aspect of our invention comprises processes for preparing the metallated polymers described above.

A first process comprises the direct reaction of a styrylphosphine polymer with a compound of the appropriate metal. This may be a metal salt, such as a halide, or a metal complex capable of bringing about ligand exchange. The styrylphosphine polymer is prepared by polymerising a styrylphosphine monomer in bulk or in solution, for example, with a conventional free-radical initiator such as azobisisobutyronitrile. The polymer is then dissolved in a dry solvent, such as tetrahydrofuran, chloroform or toluene. The metal compound is also dissolved in a solvent, preferably the same one that is used to dissolve the polymer, and the two solutions are mixed. A precipitate of the metallated polymer may form, in which case it can be filtered off, washed, and dried, but it may be necessary to evaporate all or part of the solvents to obtain solid polymers. Precipitation may also be effected by addition of a solvent which is miscible with the reaction solvent, but in which the polymer is insoluble, typically an aliphatic hydrocarbon. Evaporative techniques may be used to cast polymer films or other shapes, while precipitation methods are preferred when it is desired to produce polymers of large surface area for catalytic uses.

When a metal complex is used, it is preferably one in which a replaceable co-ordinated ligand or ligands is or are linked to the metal by a Group VB or VIB element, since they readily undergo the required ligand exchange. Examples of metal complexes are those in which the replaceable co-ordinated ligand or ligands is a carbonyl, a nitrile, such as benzonitrile, or a phosphine, such as triphenylphosphine.

It is also possible to suspend the polymer, in finely divided form, in a non-solvent for the polymer but a solvent for the metal salt or complex, for example an aliphatic hydrocarbon solvent, such as iso-octane. The metal salt is then added to the suspension and stirred until it has reacted with the polymer, which is then separated from the reaction medium for example by filtration or decantation.

A second process for preparing metallated polymers according to our invention comprises polymerising a metal complex containing at least one polymerisable styrylphosphine ligand. When it is intended to produce copolymers in this way, the comonomer is added to the polymerisation reaction. The polymerisation is carried out under conditions generally required for polymerising vinyl monomers. Thus initiators of the free radical type, such as a peroxide or azobisisobutyronitrile, may conveniently be used. The reaction should be carried out in a solvent, which may be the co-monomer, preferably in the absence of air. The metal complex containing the polymerisable styrylphosphine ligand may be prepared either by contacting a monomeric styrylphosphine with a metal salt, or by ligand exchange with a metal complex containing displaceable ligands such as phosphine, acetylacetonate or nitrile.

The above-mentioned processes may be carried out at room temperature, though higher or lower temperatures may be used if desired. Temperatures from 25° C. to 130° C. are generally suitable. Ambient pressures usually suffice, but elevated pressure may be used if it does not interfere with the process. Air need not necessarily be excluded, unless the metal complex is unstable in air, though air-free systems may be desirable when catalytic materials are being prepared, to avoid inadvertent loss of activity.

A further aspect of our invention comprises a process for the hydroformylation of olefines, using a suitable metallated polymer according to our invention as catalyst.

Accordingly, a process for the preparation of aldehydes and/or alcohols, comprises reacting an olefin with carbon monoxide and hydrogen in the presence of a catalyst comprising a polymer of a styrylphosphine having metals of Group VIII of the Periodic Table co-ordinated with the phosphorus atoms. A particularly suitable metal of Group VIII is cobalt.

The hydroformylation process is carried out by contacting a catalyst of the type described above, with an olefin, carbon monoxide and hydrogen. It may be operated at combined hydrogen/carbon monoxide pressures up to and exceeding 250 atmospheres, but the pressure is usually kept as low as possible for economic reasons. Pressures in the range 50 to 150 atmospheres are generally satisfactory.

The reaction temperature may be within the range 100° C. to 300° C., preferably within the range 100° C. to 200° C.

It is preferred to introduce the catalyst into the reaction zone as a suspension in a solvent which is liquid under the conditions of the hydroformylation reaction. The solvent may be the olefin to be treated; it should otherwise be inert under the reaction conditions or be a product of the hydroformylation process. Suitable solvents are saturated hydrocarbons, recycled products, or high boiling residues from subsequent recovery processes.

Catalyst concentrations are not generally critical, provided that they are such that the reaction proceeds at an acceptable rate. In practice the upper limit of concentration is dictated by economic considerations.

The hydrogen to carbon monoxide ratio is preferably within the range 1:1 to 4:1. The reaction may be operated batchwise or continuously.

The invention will now be illustrated by the following Examples in which parts are by weight.

EXAMPLE 1

A solution of anhydrous cobaltous chloride (49 parts; 2.2 equiv.) in dry tetrahydrofuran (THF) (9000 parts) was added dropwise to a stirred solution of poly(diphenylstyrylphosphine) (100 parts; 1 equiv.) in THF (9000 parts) at room temperature.

The resultant blue precipitate was filtered after ½ hour and was washed with dry THF to remove the excess reactants.

The dried cobalt-containing polymer (103 parts, 83%) had the following composition:

Calculated: Cl 10.1, Co 8.34, P 8.79
Found: Cl 8.94, Co 6.68, P 8.80

EXAMPLE 2

To a stirred solution of poly(diphenylstyrylphosphine) (98 parts, 1 equiv.) in chloroform was added bis(benzonitrile) palladium chloride (148 parts, 2.2 equiv.) also in chloroform. After 1 hour at room temperature the resultant precipitate was filtered, washed with chloroform and acetone and dried to give 126 parts (96%) of a palladium-containing polymer which analysed as follows:

Calculated: Cl 9.43, P 8.21, Pd 14.11
Found: Cl 11.56, P 7.41, Pd 20.28

EXAMPLE 3

The procedure of Example 2 was repeated with poly(diphenylstyrylphosphine) (100 parts) and bis (benzonitrile) platinum chloride (182 parts, 2.2 equiv.). The platium-containing polymer was obtained in good yield and had the following composition.

Calculated: Cl 8.42, P 7.36, Pt 23.14
Found: Cl 8.70, P 7.37, Pt 23.07

EXAMPLE 4

A solution of bis(benzonitrile) palladium chloride (23.7 parts) in excess chloroform was added to a stirred solution of diphenylstyrylphosphine-styrene copolymer (50 parts) also in chloroform during 10 mins. at room temperature.

The reaction mixture was refluxed for ½ hour and then evaporated to low bulk. Traces of chloroform insoluble material were filtered and the filtrate was added dropwise to stirred hexane.

The resultant precipitate was filtered and dried to give a deep yellow palladium-containing copolymer (40 parts, 72%) which analysed as follows:

Calculated: Cl 4.03, P 3.52, Pd 6.02
Found: Cl 4.55, P 3.95, Pd 7.81

EXAMPLE 5

A solution of bis(triphenylphosphine) nickel dibromide (16.35 parts) in toluene was added dropwise to a stirred solution of diethylstyrylphosphine-styrene copolymer (50 parts) in toluene at room temperature during 15 mins.

The red solution was stirred for a further 30 mins. at room temperature and was then evaporated to a dryness. The pink solid was triturated with warm hexane to remove triphenylphosphine and was then filtered. After drying at 90° C., the nickel-containing copolymer was obtained in 85% yield, and analysed as follows:

Calculated: Ni 1.95, P 2.06
Found: Ni 1.27, P 2.45

EXAMPLE 6

Azobisisobutyronitrile (1 part) was added to a solution of bis(diethylstyrylphosphine) nickel dibromide (100 parts) in benzene and the solution was refluxed for 5 hours to cause polymerisation to occur.

The solid polymer, which had been deposited during the reaction, was filtered, washed with benzene and dried to give 48% yield of a nickel-containing polymer.

Calculated: Ni 9.6, P 10.3
Found: Ni 9.19, P 8.52

EXAMPLE 7

Method A

A solution of titanium tetrachloride (19 parts) in sodium dried benzene was added dropwise to a stirred solution of poly(diphenylstyrylphosphine), (63 parts) in benzene under nitrogen. After stirring for 3 hours at room temperature the precipitated material was filtered under nitrogen and washed with benzene to give an 82% yield of the pink-red coloured titanium-containing polymer.

Method B

To a stirred slurry of a diethylstyrylphosphine-styrene copolymer (6 parts) in iso-octane under nitrogen was added a solution of titanium tetrachloride (17 parts) in iso octane. The reaction mixture was stirred at 70° for 4 hours under nitrogen. The suspension was filtered under nitrogen and washed with isooctane. Analysis showed that the metal content of the metallated polymer was 65% of that theoretically possible.

EXAMPLE 8

A solution of manganese carbonyl (24 parts) and poly(diphenyl-styrylphosphine) (60 parts) in xylene was refluxed for 6 hours. After 2 hours a heavy brown precipitate was formed. The reaction mixture was filtered and the precipitate was washed with xylene to give 78% yield of the manganese containing polymer.

EXAMPLE 9

A mixture of chromium hexacarbonyl (22 parts) and poly(diphenylstyrylphosphine) (60 parts) were refluxed in diglyme for 6 hours. The reaction mixture was cooled and added to petroleum ether (100–120° C.). The precipitate was filtered, washed with toluene, dried and weighed to give 73% of the pale yellow metallated polymer.

EXAMPLE 10

To a stirred solution of poly(diphenylstyrylphosphine) (63 parts) in benzene was added a solution of vanadium hexacarbonyl (22 parts) in benzene. The reaction mixture was stirred at room temperature for 4 hours and the metallated polymer was isolated in the usual way by precipitation from petroleum ether (100–120° C.).

EXAMPLE 11

A solution of poly(diphenylstyrylphosphine) (41.3 parts) in dry toluene (870 parts) was added dropwise to a stirred solution of $Co_2(CO)_8$ (27 parts) in toluene (3500 parts) at room temperature over a period of 15 minutes. The reaction mixture was stirred for a further period of 1 hour at room temperature at the end of which time the insoluble metallated polymer was filtered, washed free of excess cobalt carbonyl with toluene, dried and analysed.

Calculated: Co 12.83%, P 6.75%
Found: Co 12.83%, P 7.29%

The above material (12.5 parts) was suspended in a 25% (v./v.) solution of hexene 1 in benzene (6100 parts). The mixture was reacted in a glass lined autoclave at 60 ats., 170° C. for 5 hours with a $CO/H_2$, 1/1 mixture. At the end of the reaction period the insoluble catalyst was removed by filtration. GLC analysis of the filtrate showed that 93% of the hexene-1 had been hydroformylated. The filtrate contained only a negligible quantity of Co (<1% of the total Co present), illustrating the catalyst removal was simply and efficiently accomplished.

EXAMPLE 12

A solution of diethylstyrylphosphine/styrene copolymer (78.9 parts) in dry toluene (1300 parts) was added dropwise at room temperature to a stirred solution of $Co_2(CO)_8$ (24.6 parts) over a period of 15 minutes. The reaction mixture was stirred for a further period of 1½ hours at the end of which time the metallated polymer was filtered, washed with toluene, dried and analysed.

Calculated: Co 7.9%, P 4.1%
Found: Co 6.86%, P 3.82%

The above material (45 parts) was suspended in a 25% (v./v.) solution of hexene-1 in benzene (6100 parts). The mixture was reacted in a glass-lined autoclave, at 60 ats., 170° C. with a $CO/H_2$ 1/1 mixture, samples being withdrawn at intervals and analysed by GLC. The GLC analysis of the sample withdrawn after 45 minutes showed hexene-1 12%, heptaldehyde 82%, heptanols 6%.

One advantage obtained by using our metallated polymers as catalysts in the type of reaction illustrated by Examples 11 and 12 resides in the fact that the catalyst residues may be readily removed from the product e.g. by filtration. The bulk of the metal component of the catalyst is removed at the same time leaving only a small amount (commonly <1% of the metal involved) in the product.

EXAMPLE 13

The nickel containing polymer (25 parts) of Example 5 was packed with granular pumice into a vertically held micro-reactor tube.

Dry oxygen free nitrogen was passed through the apparatus overnight and then dry oxygen free propylene gas was introduced at the rate of 100–150 ml./min.

Ethyl aluminum dichloride (sufficient to give an Al/Ni ratio of 10/1) was introduced on to the column using the propylene as a carrier gas. Having passed propylene through the reactor for 4 hours at atmospheric pressure, the liquid product which had collected in a receiver at the base of the column, was analysed by GLC. The product consisted in the main of hexenes (85%) together with a smaller amount of nonenes (12%) and traces of higher boiling point products.

It will be appreciated that other compounds capable of acting as Lewis acids may be used instead of the ethyl aluminium dichloride.

What I claim is:

1. A metallated polymer comprising a polymer of styrylphosphine having transition metal atoms co-ordinated to the phosphorus atoms, wherein the metal atoms are selected from the metals of Groups IVA to VIII, and IB of the Periodic Table, the polymer being one formed by the polymerisation of a substituted styrene containing at least one phosphine group, of formula $PR_2$, as a substituent on the benzene ring, where R is a hydrocarbyl group.

2. A metallated polymer according to claim 1 in which the polymer is selected from poly(diphenylstyrlphosphine), poly(diethylstyrylphosphine) and their copolymers with styrene.

3. A metallated polymer according to claim 1 in which the metal is cobalt, nickel, platinum or palladium.

4. A metallated polymer according to claim 1 in which the metal is titanium, chromium, vanadium or manganese.

References Cited

UNITED STATES PATENTS

| | | | |
|---|---|---|---|
| 3,050,562 | 8/1962 | Klopfer | 260—598 |
| 3,065,210 | 11/1962 | Abramo | 260—80 PS |
| 3,576,881 | 4/1971 | Senn, Jr. | 260—604 HF |
| 3,636,159 | 1/1972 | Solomon | 260—604 HF |

OTHER REFERENCES

D. Braun, Makromolekulare Chem., 62 (1962), pp. 183, 188, 189.

JOSEPH L. SCHOTER, Primary Examiner

C. A. HENDERSON, JR., Assistant Examiner

U.S. Cl. X.R.

260—88.1 P, 604 HF, 632 HF